US005597663A

United States Patent [19]
Pendalwar et al.

[11] Patent Number: 5,597,663
[45] Date of Patent: Jan. 28, 1997

[54] LOW TEMPERATURE MOLTEN LITHIUM SALT ELECTROLYTES FOR ELECTROCHEMICAL CELLS

[75] Inventors: Shekhar L. Pendalwar, Sunrise; Frank R. Denton, III, Coral Springs, both of Fla.

[73] Assignee: Motorola, Inc., Schaumburg, Ill.

[21] Appl. No.: 452,898

[22] Filed: May 30, 1995

[51] Int. Cl.$^6$ ............................................... H01M 10/40
[52] U.S. Cl. ................................................ 429/198; 568/6
[58] Field of Search ................................ 429/198; 568/6; 556/176, 182

[56] References Cited

U.S. PATENT DOCUMENTS

| | | | |
|---|---|---|---|
| 3,761,500 | 9/1973 | Thomas | 556/182 |
| 3,773,816 | 11/1973 | Honigschmid-Grosslich et al. | 556/182 |
| 4,313,891 | 2/1982 | Dozzi et al. | 568/6 |
| 4,894,302 | 1/1990 | Hoffman et al. | 429/198 X |

OTHER PUBLICATIONS

Mat. Res. Soc. Proc. vol. 135 1989 Materials Research Society, pp. 343–349 month unknown.
0897–4756/91/280 3–0418 1991 ACS Synthesis and Electrical Response of Single–Ion Conducting Network Polymers Based on Sodium Poly(tetraalkoxyaluminates), pp. 418–423 month unknown.

*Primary Examiner*—Stephen Kalafut
*Attorney, Agent, or Firm*—Kenneth M. Massaroni; Scott M. Garrett

[57] ABSTRACT

An electrochemical cell (10) including a positive electrode (20), a negative electrode (30) and a low temperature organic, liquid lithium salt electrolyte (40) is provided. The low temperature lithium salt electrolyte includes a central atom selected from the group of aluminum, boron, gallium, indium, or thallium and at least four substituent groups which are organic, alkoxy groups. A unique characteristic of the electrolyte is that it remains liquid at ambient temperatures, as compared to most lithium salt electrolytes which are solid at room temperatures.

12 Claims, 5 Drawing Sheets

LOW TEMPERATURE MOLTEN LITHIUM SALT ELECTROLYTES FOR ELECTROCHEMICAL CELLS

TECHNICAL FIELD

This invention relates in general to the field of electrolytes for electrochemical cells, and more particularly to lithium salt electrolytes for such cells.

BACKGROUND OF THE INVENTION

There has been a great deal of interest in developing better and more efficient methods for storing energy for applications such as radio communication, satellites, portable computers, and electric vehicles to name but a few. There have concurrently been recent efforts to develop high energy, cost-effective batteries and/or electrochemical capacitors having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being regenerated (i.e., recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as found in conventional wet cell batteries or solid films as are available in newer, more advanced battery systems. Each of these types of systems has advantages, though they have inherent limitations which make them unsuitable for particular applications. For example, solvent free solid polymer electrolytes have heretofore had vastly inferior properties such as low ionic conductivity. Glassy inorganic electrolytes have suffered from brittleness, interfacial resistance and narrow voltage limits. Specifically, conventional solid electrolytes have ionic conductivities in the range of $10^{-5}$ S/cm, whereas acceptable ionic conductivity is typically in the range to $10^{-3}$ S/cm. Good ionic conductivity is necessary to ensure a battery system capable of delivering usable amounts of power for a given application. Good ionic conductivity is necessary for the high rate operation demanded by, for example, cellular phones, power tools, and portable computers. Accordingly, solid electrolytes are not yet adequate for many high performance batteries.

With respect to liquid electrolytes, many such systems have been known for many years but have yet to yield acceptable performance results in newer battery systems, such as lithium polymer and lithium ion battery systems. Molten organic salts, because of their generally high ionic conductivities, would be preferred electrolytes in lithium polymer and lithium ion electrochemical cells. However, most known molten salt electrolytes are inorganic and their use is effectively limited to high temperature applications because of melting points that typically exceed approximately 450° C. Lithium salts in particular have high melting points; however, lithium salts are potentially the most interesting for use as electrolytes in lithium polymer and lithium ion electrochemical cells. Further, where typical liquid electrolytes are concerned, evaporation and permeation pose significant concerns. However, pure molten salt materials would not pose these problems.

Accordingly, there exists a need to provide a stable, molten, organic lithium salt electrolyte which has a melting point that allows for use in the liquid phase at ambient temperatures. These materials should be relatively easy to synthesize, possess high ionic conductivity, and be stable for long term use in electrochemical cells.

DETAILED DESCRIPTION OF THE PREFERRED EMBODIMENT

Figure 1:
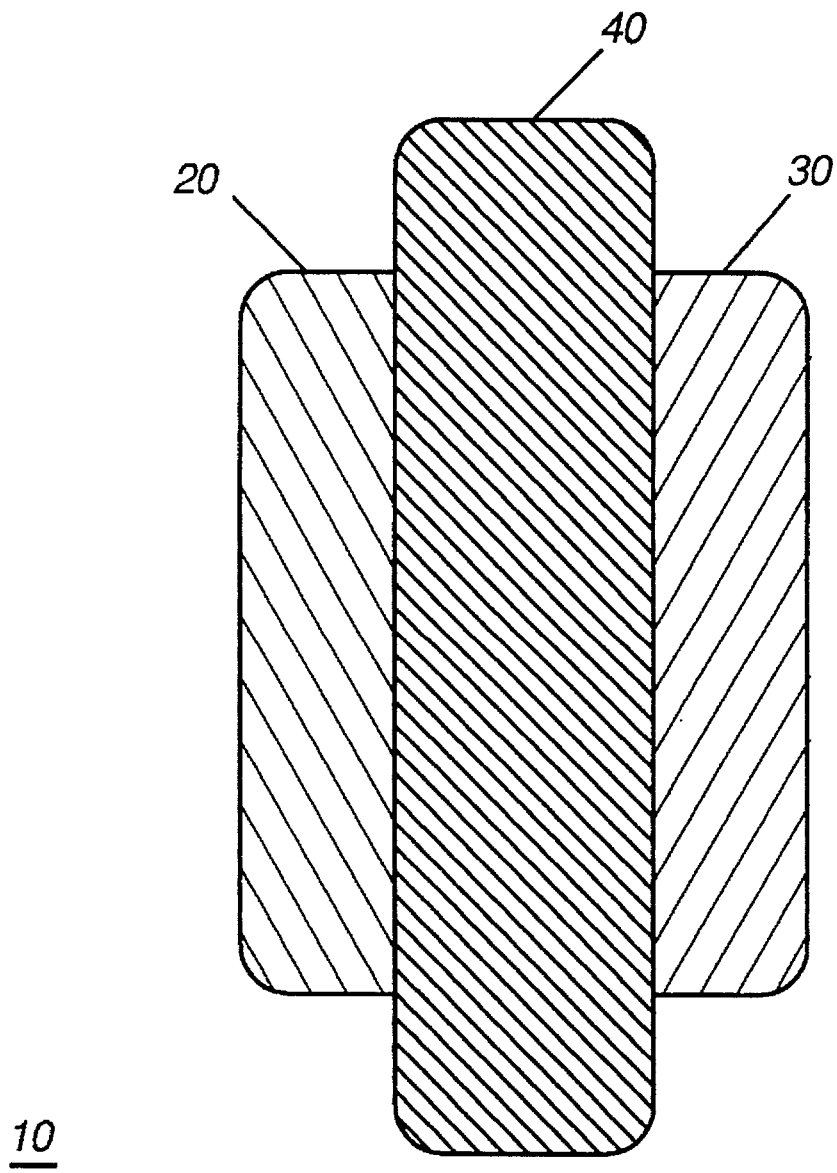
FIG. 1 is a representation of an electrochemical cell including a low temperature liquid organic lithium salt electrolyte in accordance in the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of an electrochemical cell 10 including a low temperature liquid organic lithium salt electrolyte in accordance in the instant invention. The electrochemical cell 10 includes a positive electrode 20 and a negative electrode 30 and has an electrolyte 40 disposed therebetween. The cell 10 further includes a positive electrode 20 fabricated of a transition metal oxide such as a nickel oxide, a manganese oxide, or a cobalt oxide as is known in the art. The negative electrode 30 or anode of the cell 10 may be fabricated of materials selected from the group of materials consisting of lithium metal, lithium alloys such as lithium aluminum, carbon including graphite and petroleum coke, low voltage lithium intercalation compounds, such as lithium titanium disulfide, lithium titanium dioxide, and combinations thereof. The electrolyte 40 disposed between the electrodes is a liquid electrolyte absorbed into a carrier species such as a polymer, examples of which include polyurethane, polyethylene oxide, polyacrylonitrile, poly(styrene sulfonate), or other carriers as are known in the art. Alternatively, the electrolyte may simply be a liquid i.e., without the polymer.

The liquid electrolyte is a low temperature liquid organic salt electrolyte having the formula:

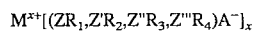

wherein $M^+$ is a group IA or IIA metal, and preferably lithium; Z, Z', Z" and Z'" are each selected from the group of oxygen, sulfur and nitrogen; A is a group IIIB element, i.e., boron, aluminum, gallium, indium, or thallium, and combinations thereof;

and $R_1$, $R_2$, $R_3$, and $R_4$ are each an organic group which may include up to 20 carbons and be either substituted or unsubstituted. Each of $R_1$, $R_2$, $R_3$, and $R_4$ may either be symmetric, that is each the same, or may be asymmetric, that is one or more may be different.

As used herein, the term low-temperature liquid, refers to the fact that compounds such as those described herein have heretofore typically been solids at room temperatures. That has made for difficulty in fabricating electrochemical cell electrolytes from such materials as liquids are generally preferred to solids, since liquids are better able to provide intimate contact with the electrodes with which they act. As used herein, low temperature liquid refers to the fact that the electrolytes disclosed herein are liquids at room temperatures. Indeed, and as will be demonstrated hereinbelow, the electrolytes remain liquid to temperatures as low as −29° C., with lower temperatures possible.

The low temperature molten lithium salt electrolytes described herein can be further understood as having a central anion having a negative charge and being selected from the group of IIIB elements, and further including at least four organic alkoxy ligands arranged around said anion center. The ligands are long bonded chemical ligands which are "floppy" and which are arranged so as to shield and dissipate the negative charge of the central anion.

As used herein, the term "floppy" refers to a rapid relaxation characteristic in which low glass or melt transition temperatures are favored by facile bond rotation, long bond lengths, low dielectric constants and minimal steric interaction. It is believed by its rapid relaxation and shielding of such negative charge, the material retains a liquid characteristic at ambient temperatures. The ligands may optionally include substituents which may chelate metal ions, such as glyme segments, pendant nitrile functionalities, acetoacetonate moieties, thio ethers, amines and amides to name a few.

The negative charge bearing atom is chosen so as to favor the charge state and stable bonding. Accordingly, in one preferred embodiment, the negative charge bearing atom is an aluminum or boron atom. In such a preferred embodiment, $R_1$, $R_2$, $R_3$ and $R_4$ represent floppy ligands such as methyl terminated oligomers of poly(ethylene oxide) or poly(propylene oxide) with linkage to the central charge bearing atom through an oxygen or other heteroatom. Alternatively, oligomers of other polymers known to dissolve lithium salts, and to have low glass transition temperatures may be employed as ligands. One preferred methyl terminated oligomer which may be used as one or more of $R_1$, $R_2$, $R_3$ or $R_4$ is a 2-methoxyethoxy or similar moiety with fast relaxation characteristics.

The electrolytes may further be modified by adding other salts, polymers, solvents, surfactants, and/or other components in order to achieve desired properties. For example, the salt may be combined with between 5 and 50% poly(ethylene oxide), polyacrylonitrile, or other polymer hosts to provide films with substantially solid character and electrolyte performance. One or more other lithium or non-lithium salts such as lithium iodide, lithium bis(trifluromethanesulfonyl)imide, lithium perchlorate, lithium trifluoromethanesulfonate, lithium hexafluorophosphate, lithium tetrafluoroborate, tetrahexylammonium hexafluorophosphate, or other salt may be employed to increase the ion conductivity of one component or to improve the molten character of the additives.

Solvents such as ethylene carbonate, propylene carbonate, 2-methyltetrahydrofuran, dioxolane, tetramethylurea, sulfolane, and others may be employed to lower the melting point and increase the ionic conductivity. Further, surfactants and other substances may be employed to improve interfacial absorption on active material particles or to optimize other properties as may suggest themselves to those of ordinary skill in the art.

In one preferred embodiment, the central metal ion is aluminum, and the floppy ligand is a 2-methoxyethoxy ligand. Accordingly, the resulting lithium salt electrolyte is lithium tetrakis[2-methoxyethoxy]aluminate. This material may be synthesized as described below:

EXAMPLE I

Lithium tetrakis[2-methoxyethoxy]aluminate was synthesized by reacting 2-methoxyethanol (70 ml, 0.89 mole) with a hydride such as lithium aluminum hydride (3.6 g, 0.09 g mole) at room temperature in a dry box. The excess solvent was carefully removed under vacuum to obtain a lithium tetrakis (2-methoxyethoxy)aluminate, a viscous, colorless liquid, the structure of which was confirmed by NMR analysis. The chemical formula of this electrolyte is:

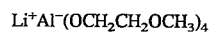

$$Li^+Al^-(OCH_2CH_2OCH_3)_4$$

Figure 2:
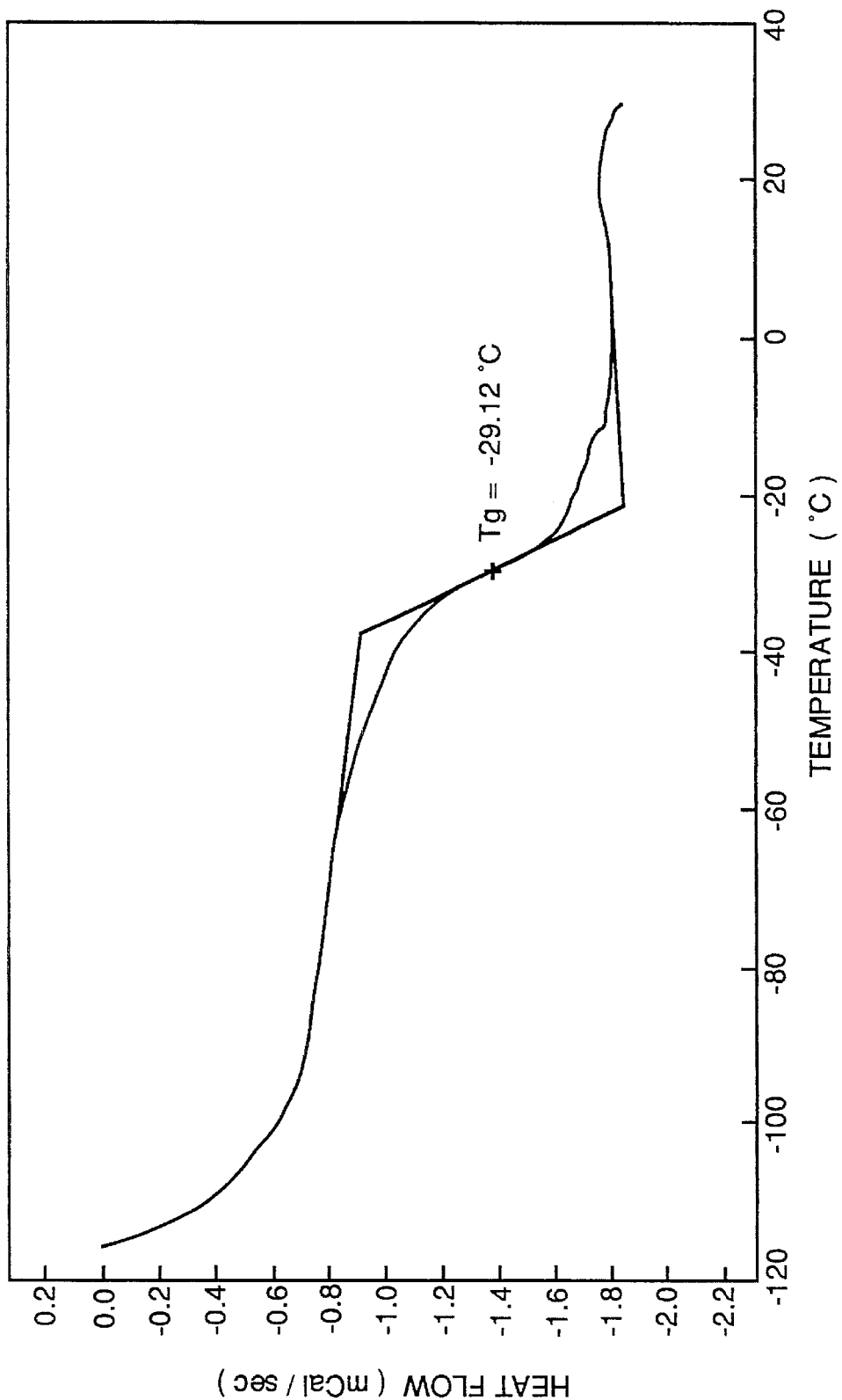
FIG. 2 is a differential scanning calorimetry/thermal gravimetric analysis (DSC/TGA) graph illustrating the temperature at which a first electrolyte material in accordance with the instant invention becomes liquid.

Using the lithium tetrakis[2-methoxyethoxy]aluminate yielded by the above process, said material was subjected to a DSC/TGA analysis which yielded the results illustrated in FIG. 2 hereof. As may be appreciated from a perusal of FIG. 2, the temperature at which the material changed from the solid to the liquid state was −29.12° C. Accordingly, the liquid electrolyte will remain in the liquid state at room temperatures so as to continue to perform as a liquid electrolyte when incorporated into an electrochemical cell.

Figure 3:
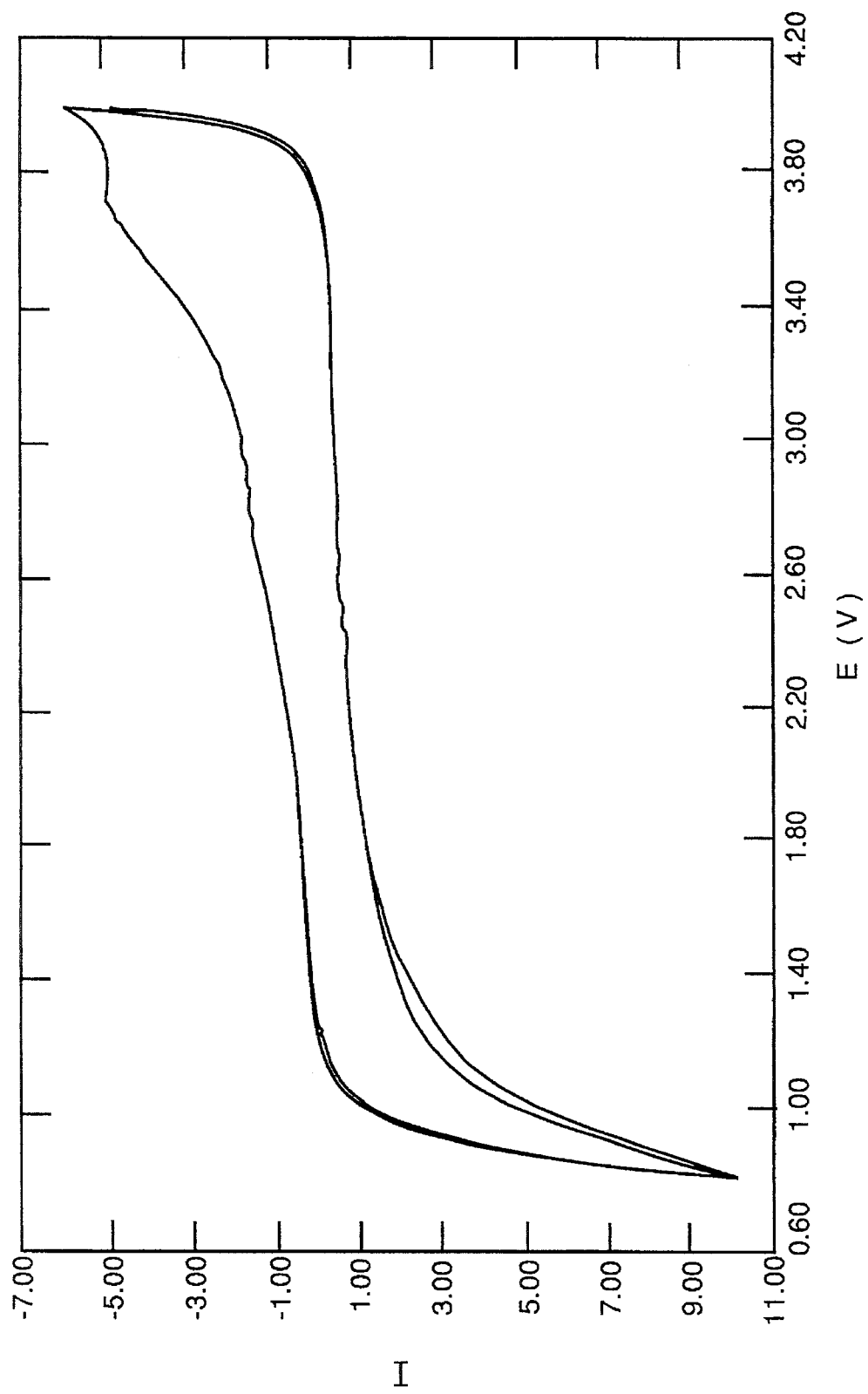
FIG. 3 is a cyclic voltammagram demonstrating the voltage stability window of low temperature liquid lithium salt electrolytes in accordance in the instant invention.

Referring now to FIG. 3, there is illustrated the cyclic voltammagram of the material, indicating a voltage stability window of greater than approximately 2 volts. More specifically, the liquid electrolyte was stable between 1.2 and 3.5 volts versus lithium. This voltage stability window indicates that the liquid electrolyte will work appropriately in many known electrochemical systems.

The ionic conductivity of the material made in accordance with this Example I was then measured. Ionic conductivity of a solution of salt and propylene carbonate was measured to be $1.4 \times 10^{-4}$ Siemens per centimeter (S/cm) at room temperature. Ionic conductivity of a solution of the salt in tetramethylurea (25%) was found to be $5.5 \times 10^{-4}$ S/cm at room temperature, though conductivity increased at higher temperatures. An ionic conductivity of $3.8 \times 10^{-5}$ S/cm was shown at room temperature for an 11% solution of bis(trifluoromethanesulfonyl)imide salt in the aluminate. At higher temperatures, more salt can be added and consequently a 16% solution of the same salt in the aluminate showed an ionic conductivity of $10^{-3}$ S/cm at 118° C. Ionic conductivity of the aluminate (i.e., w/o any salt) was about $10^{-5}$ S/cm at room temperature.

EXAMPLE II

Lithium tetrakis[2-(2-methoxyethoxy)ethoxy]aluminate was synthesized by careful addition of 2-(2-methoxyethoxy)ethanol (10 mL, 0.084 mol) to a hydride such as lithium aluminum hydride (0.47 g, 0.0125 mole) at room temperature in a dry box. The addition was completed in 0.5 h and stirring was continued. The reaction mixture was filtered to obtain a clear solution. The excess solvent was removed under high vacuum at elevated temperature to obtain the product as a viscous colorless liquid. The chemical formula of the electrolyte is:

$$Li^+Al^-(OCH_2CH_2OCH_2CH_2OCH_3)_4$$

Figure 4:
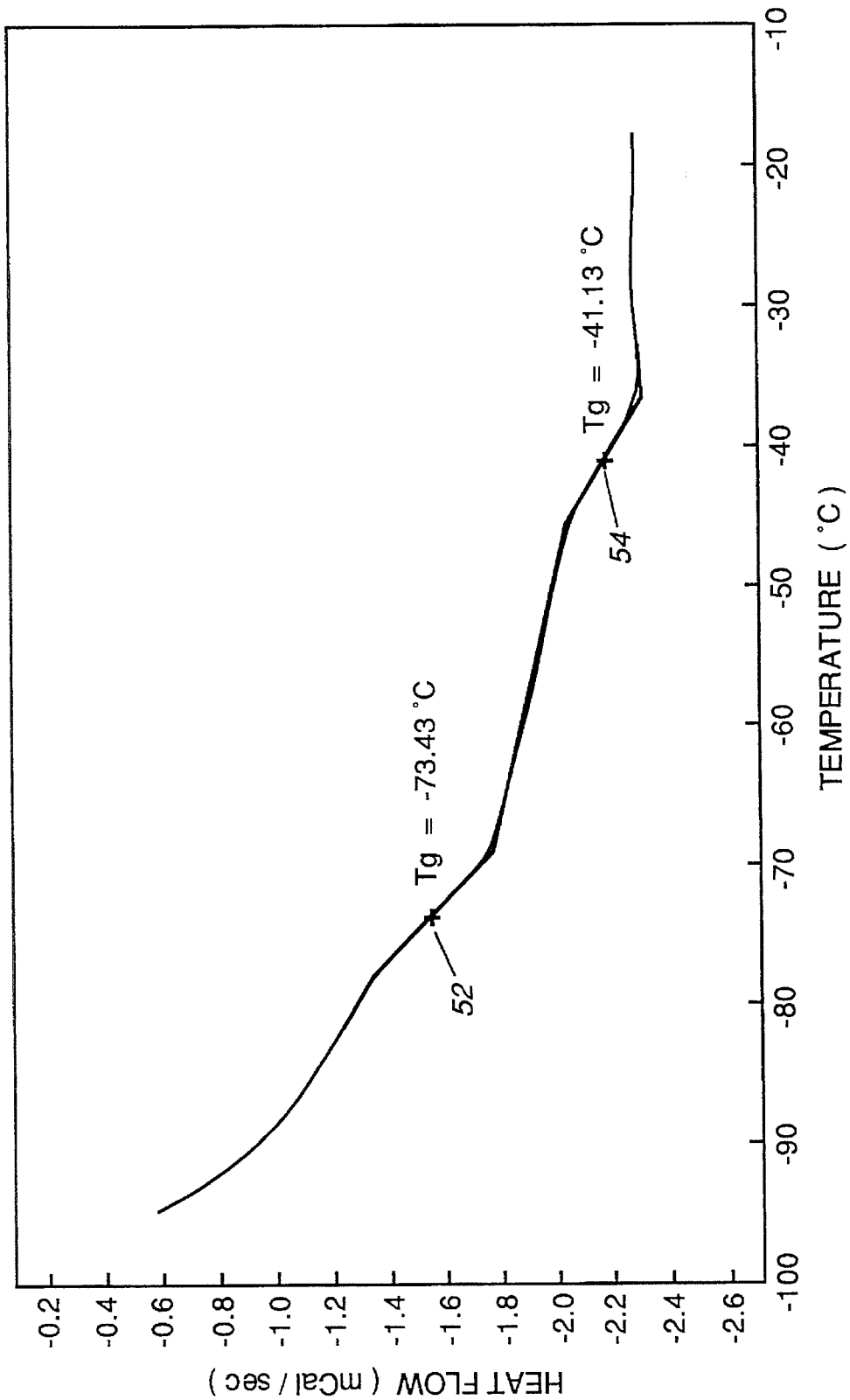
FIG. 4 is a DSC/TGA graph illustrating the temperature at which a second electrolyte material in accordance with the instant invention becomes liquid.

Referring now to FIG. 4, there is illustrated a DSC/TGA study of this product showing two transition temperatures at −73.43° C., point 52, and −41.13° C., point 54. Thus, the electrolyte will stay liquid at room temperature.

EXAMPLE III

Examples I and II illustrated the performance of symmetric systems. That is the "floppy" ligands represented by $R_1$, $R_2$, $R_3$, and $R_4$ were are the same. In this example, not all the ligands are the same. Specifically, the electrolyte is a lithium aluminate from diethyl glycol monomethyl ether and methoxyethanol.

A lithium salt with dissimilar substituents/groups on the central aluminum atom was synthesized by careful addition of a mixture of 2-(2-methoxyethoxy)ethanol(diethylene glycol monomethyl ether) (22.6 mL, 0.19 mol) and 2-methoxyethanol (15 mL, 0.19 mole) to a hydride such as lithium aluminum hydride (1.8 g. 0.048 mole) at room temperature in a dry box. The addition was completed in 0.5 h and stirring was continued. The reaction mixture was filtered to obtain a clear solution. The excess solvent was removed under high vacuum at elevated temperature to obtain the product as a viscous colorless liquid. The chemical formula of this electrolyte is:

$$Li^+Al^-(OCH_2CH_2OCH_3)_n(OCH_2CH_2OCH_2CH_2OCH_3)_{4-n}$$

where n=1,2 or 3

Figure 5:
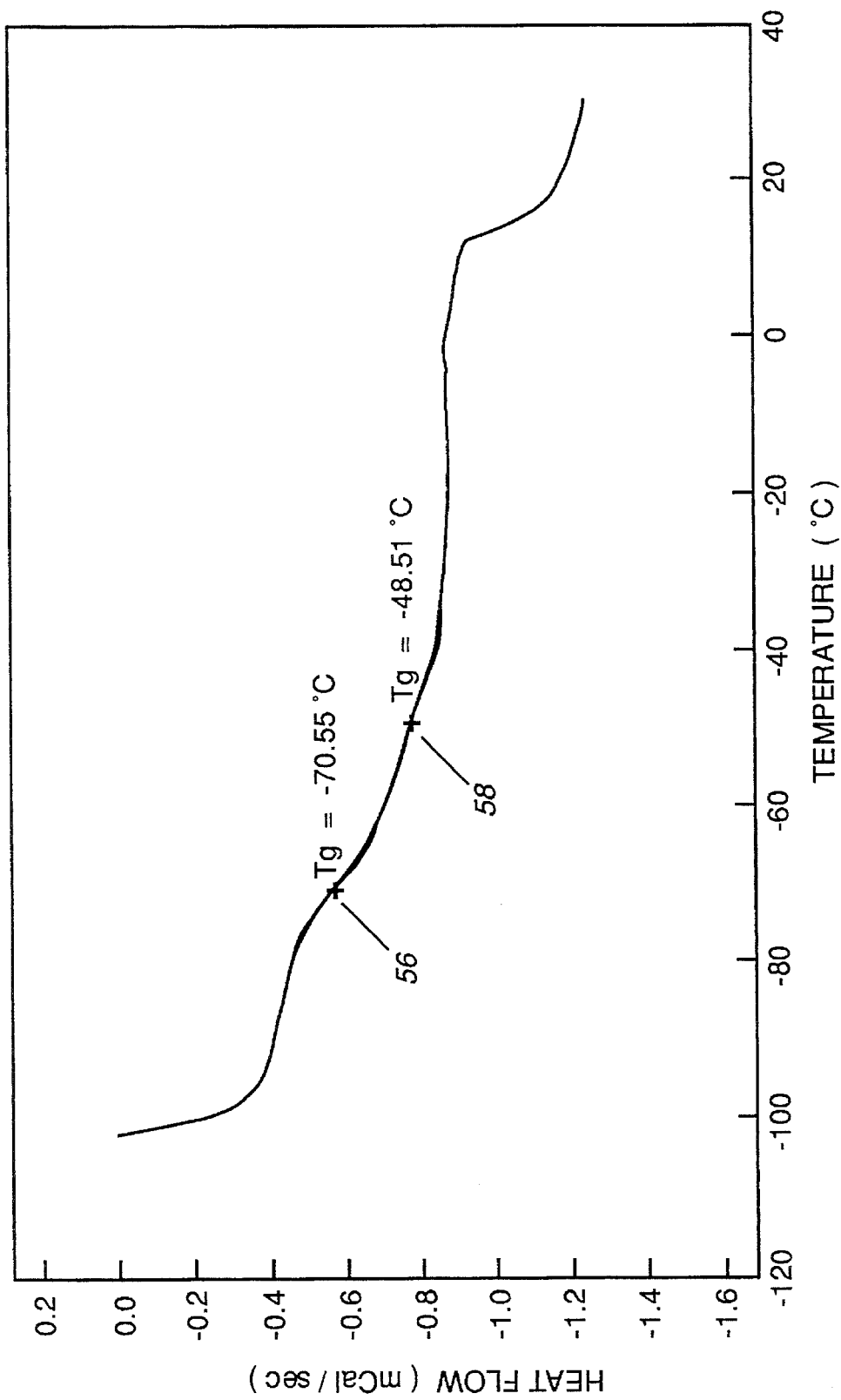
FIG. 5 is a DSC/TGA graph illustrating the temperature at which a third electrolyte material in accordance with the instant invention becomes liquid.

Referring now to FIG. 5, there is illustrated a DSC/TGA study of this product, showing two glass transition temperatures at −70.55° C., point 56 and −48.51° C., point 58. Thus, the electrolyte will stay liquid at room temperature. Ionic conductivity of this product was found to be $2.3 \times 10^{-5}$ S/cm @ 31° C.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A low temperature molten lithium salt electrolyte comprising a group III A anion center having a negative charge wherein said anion is boron and at least four organic alkoxy ligands arranged around said anion center.

2. A molten lithium salt electrolyte as in claim 1, wherein said organic alkoxy ligands are the same.

3. A molten lithium salt electrolyte as in claim 1, wherein at least one of said organic alkoxy ligands is different.

4. A molten lithium salt electrolyte as in claim 1, wherein said ligand is selected from the group consisting of 2-methoxyethoxy, 2-(2-methoxyethoxy)ethoxy, and combinations thereof.

5. An electrochemical cell comprising:

an anode;

a cathode; and a low temperature liquid organic lithium salt electrolyte having the formula $$M^{x+}[(ZR_1,Z'R_2,Z''R_3Z'''R_4)A^-]_x$$

where M is a group IA or IIA metal; A is a group III element; Z, Z', Z", and Z'" are each selected from the group of S, or O; $R_1$, $R_2$, $R_3$, and $R_4$ are each an organic group of up to 20 carbons and x is 1 or 2.

6. An electrochemical cell as in claim 5, wherein $R_1$, $R_2$, $R_3$, and $R_4$ are the same.

7. An electrochemical cell as in claim 5, wherein at least one of $R_1$, $R_2$, $R_3$, and $R_4$ is different than the others.

8. An electrochemical cell as in claim 5, wherein $R_1$, $R_2$, $R_3$ and $R_4$ are each selected from the group of substituted or unsubstituted alkoxy groups having up to 20 carbons.

9. An electrochemical cell as in claim 5, wherein $M^+$ is lithium.

10. An electrochemical cell as in claim 5, wherein $A^-$ is aluminum.

11. An electrochemical cell as in claim 5, wherein each of $ZR_1$, $Z'R_2$, $Z''R_3$, $Z'''R_4$) is 2-methoxyethoxy.

12. An electrochemical cell as in claim 5, wherein said electrolyte is lithium tetrakis[2-methoxyethoxy]aluminate.

* * * * *